(12) United States Patent
Yano

(10) Patent No.: US 12,074,277 B2
(45) Date of Patent: Aug. 27, 2024

(54) ALL-SOLID-STATE BATTERY

(71) Applicant: TDK CORPORATION, Tokyo (JP)

(72) Inventor: Tomohiro Yano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 551 days.

(21) Appl. No.: 17/293,231

(22) PCT Filed: Nov. 28, 2019

(86) PCT No.: PCT/JP2019/046500
§ 371 (c)(1),
(2) Date: May 12, 2021

(87) PCT Pub. No.: WO2020/111166
PCT Pub. Date: Jun. 4, 2020

(65) Prior Publication Data
US 2021/0384549 A1    Dec. 9, 2021

(30) Foreign Application Priority Data

Nov. 30, 2018 (JP) .................. 2018-224938

(51) Int. Cl.
*H01M 10/0562* (2010.01)
*H01M 4/525* (2010.01)
(Continued)

(52) U.S. Cl.
CPC ....... *H01M 10/0562* (2013.01); *H01M 4/525* (2013.01); *H01M 10/0525* (2013.01);
(Continued)

(58) Field of Classification Search
CPC ......... H01M 10/0525; H01M 10/0562; H01M 10/0585; H01M 2004/027;
(Continued)

(56) References Cited

U.S. PATENT DOCUMENTS

| | | | |
|---|---|---|---|
| 2005/0141170 A1 | 6/2005 | Honda et al. | |
| 2015/0288026 A1* | 10/2015 | Yamamoto | H01M 10/0585 |
| | | | 429/179 |
| 2022/0285682 A1* | 9/2022 | Yoshioka | H01M 10/0585 |

FOREIGN PATENT DOCUMENTS

| | | |
|---|---|---|
| JP | 5910737 B2 | 4/2016 |
| WO | 2013/175993 A1 | 11/2013 |

OTHER PUBLICATIONS

Mar. 3, 2020 Search Report issued in International Patent Application No. PCT/JP2019/046500.

* cited by examiner

*Primary Examiner* — Lingwen R Zeng
(74) *Attorney, Agent, or Firm* — Oliff PLC

(57) ABSTRACT

An all-solid-state battery includes: a laminated body having a first lateral face with a positive electrode and negative electrode laminated with a solid electrolyte layer therebetween and wherein a positive electrode current collector layer is exposed and a second lateral face faces the first face and wherein a negative electrode current collector layer is exposed; a positive electrode external terminal on the first face; and a negative electrode external terminal on the second face. At least one difference between a distance $Lc_n$ or a distance $Lc_{n+1}$ from a second face side edge part of a positive electrode of an $n^{th}$ layer or an $n+1^{th}$ layer to the second face and a difference between a distance $La_n$ or a distance $La_{n+1}$ from a first lateral face side edge part of a negative electrode of an $n^{th}$ layer or an $n+1^{th}$ layer to the first lateral faces is 10 μm or more.

10 Claims, 3 Drawing Sheets

(51) Int. Cl.
*H01M 10/0525* (2010.01)
*H01M 10/0585* (2010.01)
*H01M 50/543* (2021.01)
*H01M 4/02* (2006.01)
*H01M 50/533* (2021.01)
*H01M 50/534* (2021.01)
*H01M 50/54* (2021.01)
*H01M 50/548* (2021.01)
*H01M 50/562* (2021.01)

(52) U.S. Cl.
CPC .................. *H01M 10/0585* (2013.01); *H01M 2004/027* (2013.01); *H01M 2004/028* (2013.01); *H01M 50/533* (2021.01); *H01M 50/534* (2021.01); *H01M 50/54* (2021.01); *H01M 50/548* (2021.01); *H01M 50/562* (2021.01); *H01M 2220/30* (2013.01); *H01M 2300/0065* (2013.01); *Y02E 60/10* (2013.01); *Y02P 70/50* (2015.11)

(58) Field of Classification Search
CPC ....... H01M 2004/028; H01M 2220/30; H01M 2300/0065; H01M 4/525; H01M 50/533; H01M 50/534; H01M 50/54; H01M 50/548; H01M 50/562; Y02E 60/10; Y02P 70/50

See application file for complete search history.

ALL-SOLID-STATE BATTERY

TECHNICAL FIELD

The present disclosure relates to an all-solid-state battery and relates to, for example, an all-solid-state lithium ion secondary battery.

Priority is claimed on Japanese Patent Application No. 2018-224938, filed Nov. 30, 2018, the content of which is incorporated herein by reference.

BACKGROUND ART

Lithium ion secondary batteries are widely utilized as, for example, power sources for small portable devices such as portable phones, notebook PCs, and PDAs. Such lithium ion secondary batteries utilized for small portable devices are required to be smaller, thinner, and more reliable.

As lithium ion secondary batteries, lithium ion secondary batteries in which an organic electrolytic solution is utilized as an electrolyte and lithium ion secondary batteries in which a solid electrolyte is utilized as an electrolyte are known. All-solid-state lithium ion secondary batteries having a positive electrode and a negative electrode laminated with a solid electrolyte layer arranged therebetween have a higher degree of freedom in designing a battery shape, and are more easily made to have reduced battery size and thickness, and leakage of an electrolytic solution is less likely to occur therein than in lithium ion secondary batteries in which an organic electrolytic solution is utilized. Thus, all-solid-state lithium ion secondary batteries have an advantage of high reliability.

Also, since all-solid-state lithium ion secondary batteries are nonflammable like other electronic components, all-solid-state lithium ion secondary batteries have an advantage that all-solid-state lithium ion secondary batteries can be mounted on a board through reflow soldering.

However, unlike general surface-mounted electronic components such as laminated ceramic capacitors, like lithium ion secondary batteries in which an organic electrolytic solution is utilized, in all-solid-state lithium ion secondary batteries, a discharge and charge reaction is repeatedly performed through intercalation and deintercalation of lithium ions. Thus, change in volume due to expansion and contraction accompanying the discharge and charge occurs. Therefore, in all-solid-state lithium ion secondary batteries, there are a region in which a negative electrode faces a positive electrode and which contributes to a discharge and charge, that is, a region in which volume expansion and contraction occurs due to discharge and charge and a region in which a negative electrode does not face a positive electrode and which does not contribute to a discharge and charge, that is, a region in which volume expansion and contraction does not occur due to discharge and charge. For this reason, there is a problem that there is a difference between stresses applied to a solid electrolyte layer at a boundary part between a region in which volume expansion and contraction of an electrode occurs (a region in which a stress is not applied to the solid electrolyte layer) and a region in which volume expansion and contraction of the electrode does not occur (a region in which a stress is not applied to the solid electrolyte layer). If the difference between the stresses occurs at the boundary part as described above, cracks easily occur in the solid electrolyte layer. If cracks occur in the solid electrolyte layer, there is a problem that the internal resistance of all-solid-state lithium ion secondary batteries increases and sufficient cycle characteristics cannot be obtained.

In order to alleviate a difference between stresses applied to a solid electrolyte layer due to volume expansion and contraction of an electrode due to the discharge and charge and minimize the occurrence of cracks of the solid electrolyte layer, decreasing the porosity of a region close to an electrode of the solid electrolyte layer and increasing the porosity of a region away from the electrode have been studied (Patent Document 1).

CITATION LIST

Patent Document

[Patent Document 1]
   Japanese Patent No. 5910737

SUMMARY OF INVENTION

Technical Problem

However, Li ions do not pass through voids of a solid electrolyte layer. For this reason, if the porosity of the solid electrolyte layer is increased to increase the number of voids, there is a concern that a decrease in Li ion conductivity of the solid electrolyte layer occur.

The present disclosure was made in view of the above problems, and an object of the present disclosure is to provide an all-solid-state battery with excellent cycle characteristics, for which the occurrence of cracks inside a battery due to a change in volume of an electrode is minimized even if a region with high porosity is not formed on a solid electrolyte layer.

Solution to Problem

In order to achieve the above object, the present disclosure provides the following means.

(1) An all-solid-state secondary battery according to an aspect of the present disclosure includes: a laminated body including a positive electrode which has a positive electrode current collector layer and a positive electrode active material layer and a negative electrode which has a negative electrode current collector layer and a negative electrode active material layer laminated with a solid electrolyte layer arranged therebetween, lateral faces including a first lateral face which is formed as a surface parallel to a lamination direction and at which the positive electrode current collector layer is exposed, and a second lateral face which faces the first lateral face and at which the negative electrode current collector layer is exposed; a positive electrode external terminal attached to the first lateral face; and a negative electrode external terminal attached to the second lateral face, wherein at least one difference of a difference between a distance $Lc_n$ from a second lateral face side edge part of the positive electrode of an $n^{th}$ layer (here, n is a natural number) to the second lateral face and a distance $Lc_{n+1}$ from a second lateral face side edge part of the positive electrode of an $n+1^{th}$ layer to the second lateral face and a difference between a distance $La_n$ from a first lateral face side edge part of the negative electrode of an $n^{th}$ layer to the first lateral face and a distance $La_{n+1}$ from a first lateral face side edge part of the negative electrode of an $n+1^{th}$ layer to the first lateral face is 10 μm or more.

(2) In an all-solid state secondary battery according to the aspect (1), both of the difference between the distance $Lc_n$ and the distance $Lc_{n+1}$ and the difference between the distance $La_n$ and the distance $La_{n+1}$ may be 10 µm or more.

(3) In an all-solid state secondary battery according to the aspect (1) or (2), the difference between the distance $Lc_n$ and the distance $Lc_{n+1}$ and the difference between the distance $La_n$ and the distance $La_{n+1}$ may be 400 µm or less.

(4) In an all-solid state secondary battery according to any one of the aspects of (1) to (3), a maximum value of the distance $Lc_n$ from the second lateral face side edge part of the positive electrode of the $n^{th}$ layer (here, n is a natural number) to the second lateral face may be 30% or less of the distance between the first lateral face and the second lateral face.

(5) In an all-solid state secondary battery according to any one of the aspects of (1) to (4), the laminated body may further include a third lateral face and a fourth lateral face which are arranged to face each other, and at least one difference of a difference ($Wc_{n+1}-Wc_n$) between a distance $Wc_n$ from a fourth lateral face side edge part of the positive electrode of the $n^{th}$ layer to the fourth lateral face and a distance $Wc_{n+1}$ from a fourth lateral face side edge part of the positive electrode of the $n+1^{th}$ layer to the fourth lateral face and a difference ($Wa_{n+1}-Wa_n$) between a distance $Wa_n$ from the third lateral face side edge part of the negative electrode of the $n^{th}$ layer to the third lateral face and a distance $Wa_{n+1}$ from the third lateral face side edge part of the negative electrode of the $n+1^{th}$ layer to the third lateral face may be 10 µm or more.

(6) In an all-solid state secondary battery according to the aspect (5), both of the difference between the distance $Wc_n$ and the distance $Wc_{n+1}$ and the difference between the distance $Wa_n$ and the distance $Wa_{n+1}$ may be 10 µm or more.

(7) In an all-solid state secondary battery according to the aspect (5) or (6), the difference between the distance $Wc_n$ and the distance $Wc_{n+1}$ and the difference between the distance $Wa_n$ and the distance $Wa_{n+1}$ may be 400 µm or less.

Advantageous Effects of Invention

According to the present disclosure, it is possible to provide an all-solid-state battery with excellent cycle characteristics, for which the occurrence of cracks inside a battery due to volume expansion and contraction of an electrode is minimized.

DESCRIPTION OF EMBODIMENTS

Figure 1:
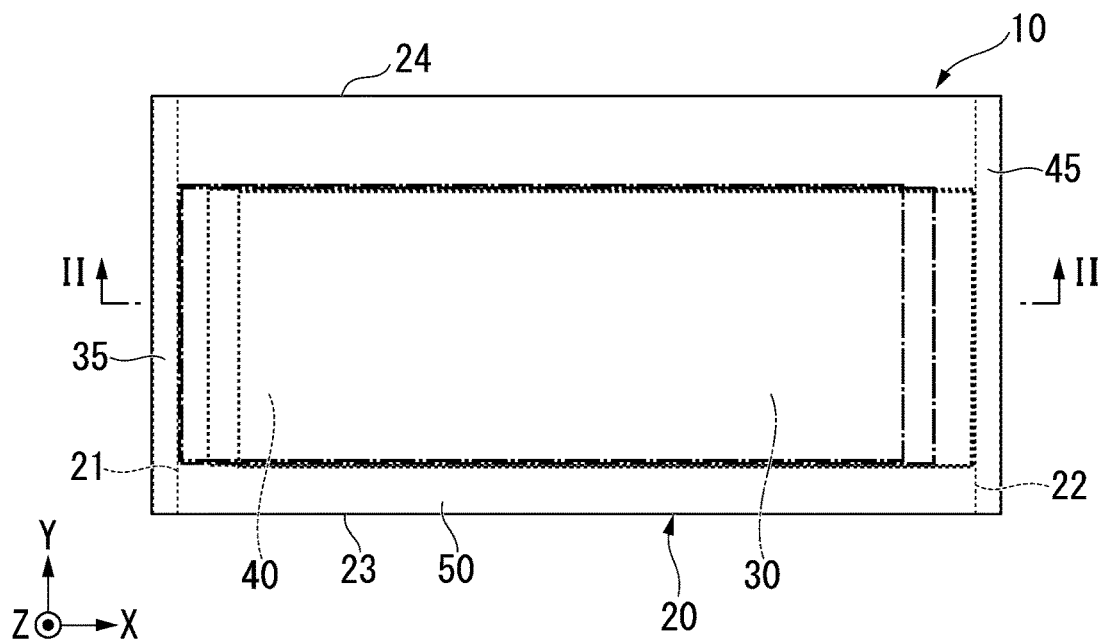
FIG. 1 is a plan view of an all-solid-state battery according to an embodiment.

The present disclosure will be described in detail below with reference to the drawings as appropriate. In the drawings used in the following description, in order to make the features of the present disclosure easy to understand, enlarged featured portions may be provided for convenience in some cases. Therefore, the dimensional ratios of the respective constituent elements illustrated in the drawings may differ from those of the actual constituent elements. The materials, the dimensions, and the like exemplified in the following description are examples and the present disclosure is not limited thereto and can be appropriately modified and carried out within the range in which the effects thereof are exhibited.

[Constitution of all-Solid-State Battery]

Figure 2:
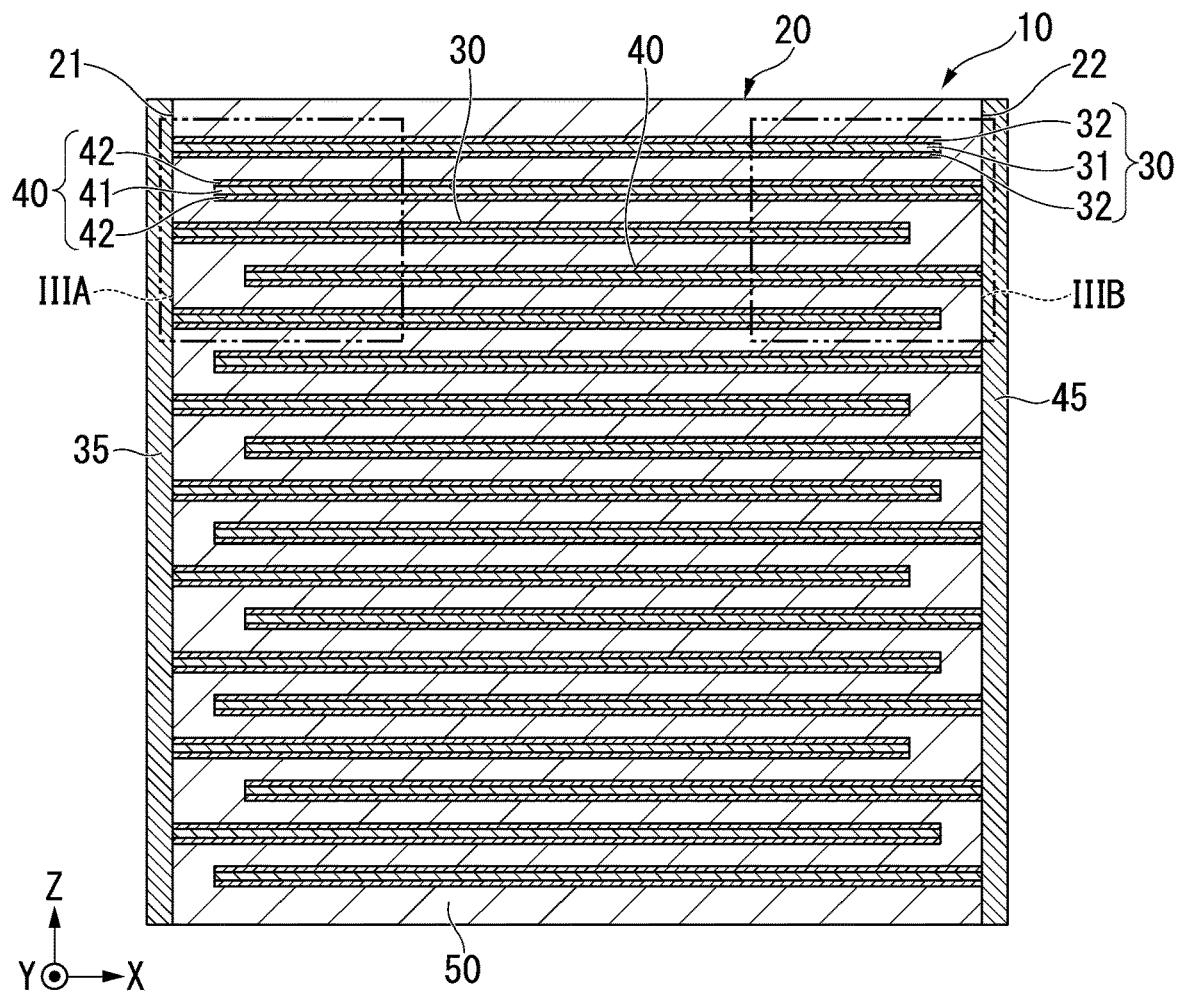
FIG. 2 is a cross-sectional view taken along line II-II of FIG. 1.
Figure 3A:
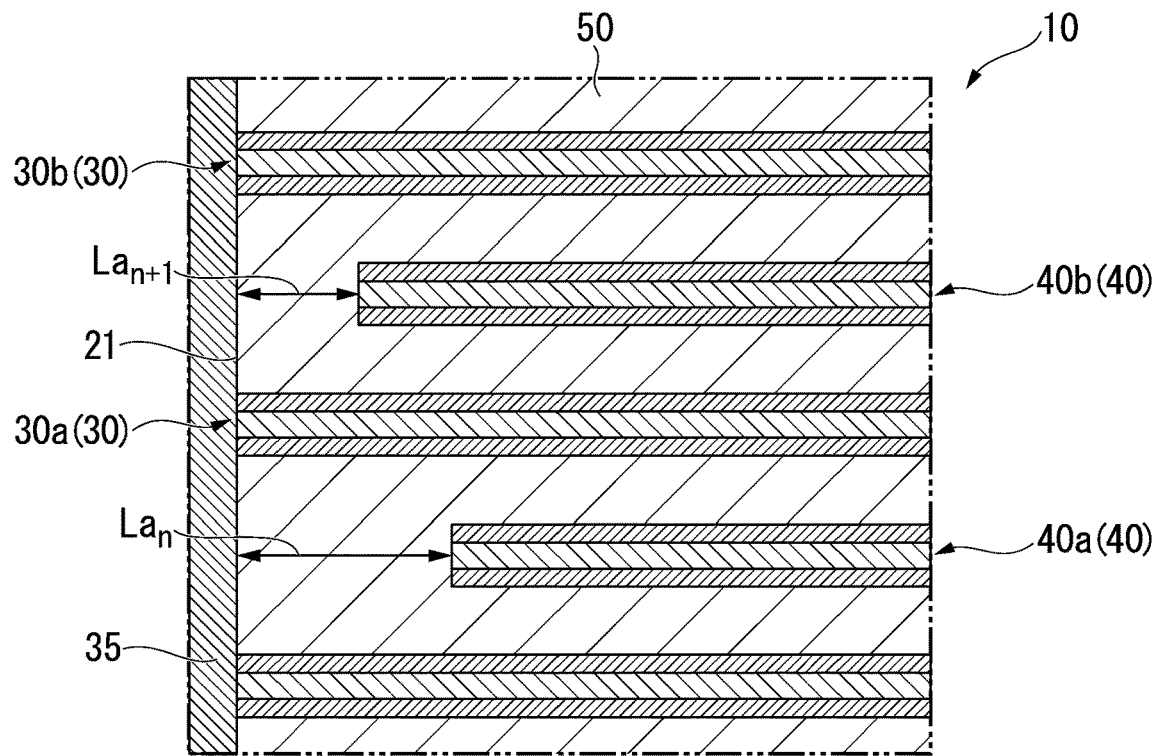
FIG. 3A is an enlarged cross-sectional view of portion IIIA of FIG. 2.
Figure 3B:
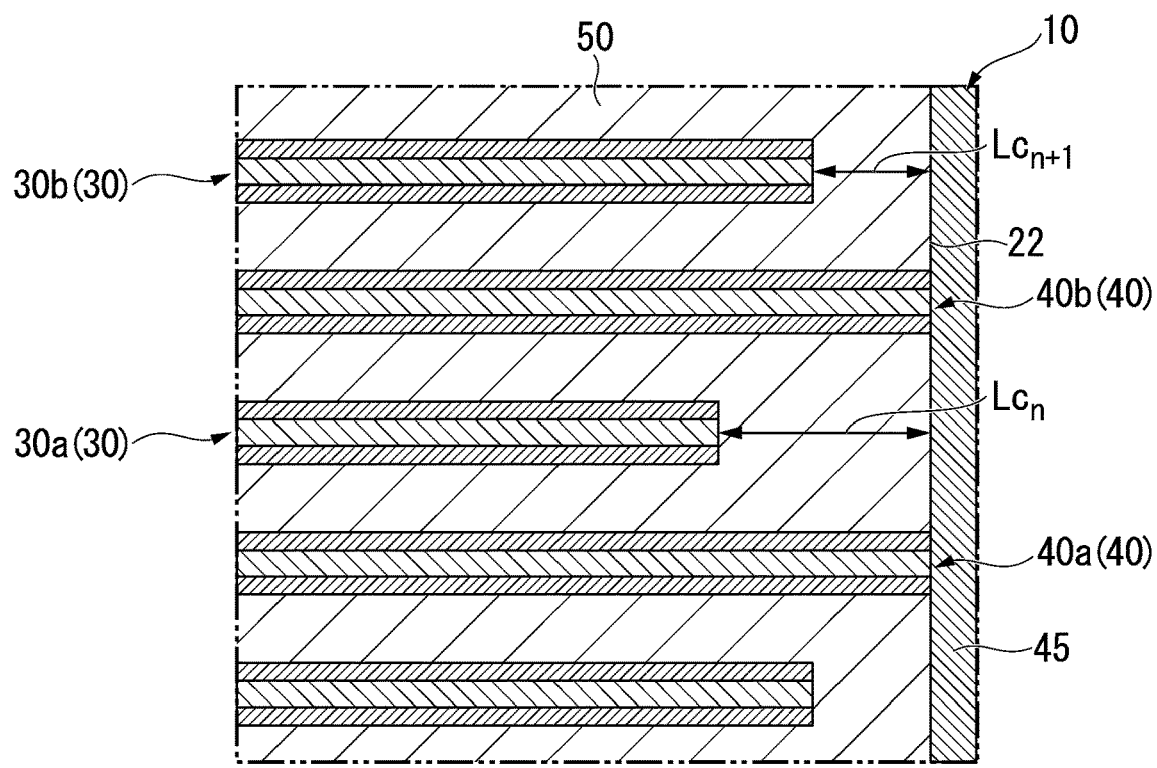
FIG. 3B is an enlarged cross-sectional view of portion IIIB of FIG. 2

FIG. 1 is a plan view of an all-solid-state battery according to an embodiment of the present disclosure. FIG. 2 is a cross-sectional view taken along line II-II of FIG. 1. FIG. 3A is an enlarged view of portion IIIA of FIG. 2 and FIG. 3B is an enlarged view of portion IIB of FIG. 2.

As illustrated in FIGS. 1 and 2, an all-solid-state battery 10 includes a laminated body 20 which has positive electrodes 30 and negative electrodes 40 laminated with solid electrolyte layers 50 arranged therebetween. The plurality of the positive electrodes 30 and the negative electrodes 40 are alternately laminated. Although the number of layers of the positive electrodes 30 and the negative electrodes 40 is not particularly limited, the total number of positive electrodes 30 and negative electrodes 40 is generally within a range of 10 layers or more and 200 layers or less, and more preferably within a range of 20 layers or more and 100 layers or less.

The laminated body 20 is a hexahedron and has four lateral face (a first lateral face 21, a second lateral face 22, a third lateral face 23, and a fourth lateral face 24) formed as surfaces parallel to a lamination direction and an upper surface formed on an upper side and a lower surface formed on a lower side as surfaces orthogonal to the lamination direction (a Z direction). A positive electrode current collector layer is exposed in the first lateral face 21 and a negative electrode current collector layer is exposed in the second lateral face 22. The third lateral face 23 is a lateral face on the right side when viewed from the side of the first lateral face 21 with the upper surface facing upward and the fourth lateral face 24 is a lateral face on the left side when viewed from the side of the first lateral face 21 with the upper surface facing upward. The first lateral face 21 and the second lateral face 22 are arranged to face each other. In the embodiment, the third lateral face 23 and fourth lateral face are provided perpendicular to the first lateral face 21 and the second lateral face 22 and arranged to face each other.

The positive electrode 30 includes a positive electrode current collector layer 31 and a positive electrode active material layer 32. The positive electrode current collector layer 31 is exposed from the first lateral face 21. The positive electrode active material layer 32 may or may not be exposed from the first lateral face 21. The negative electrode 40 includes a negative electrode current collector layer 41 and a negative electrode active material layer 42. The negative electrode current collector layer 41 is exposed from the second lateral face 22 facing the first lateral face 21. The negative electrode active material layer 42 may or may not be exposed from the second lateral face 22.

The positive electrode external terminal 35 which is electrically connected to a positive electrode current collector layer 31 is attached to the first lateral face 21 of the laminated body 20. A negative electrode external terminal 45 which is electrically connected to the negative electrode current collector layer 41 is attached to the second lateral face 22 of the laminated body 20.

Figure 4A:
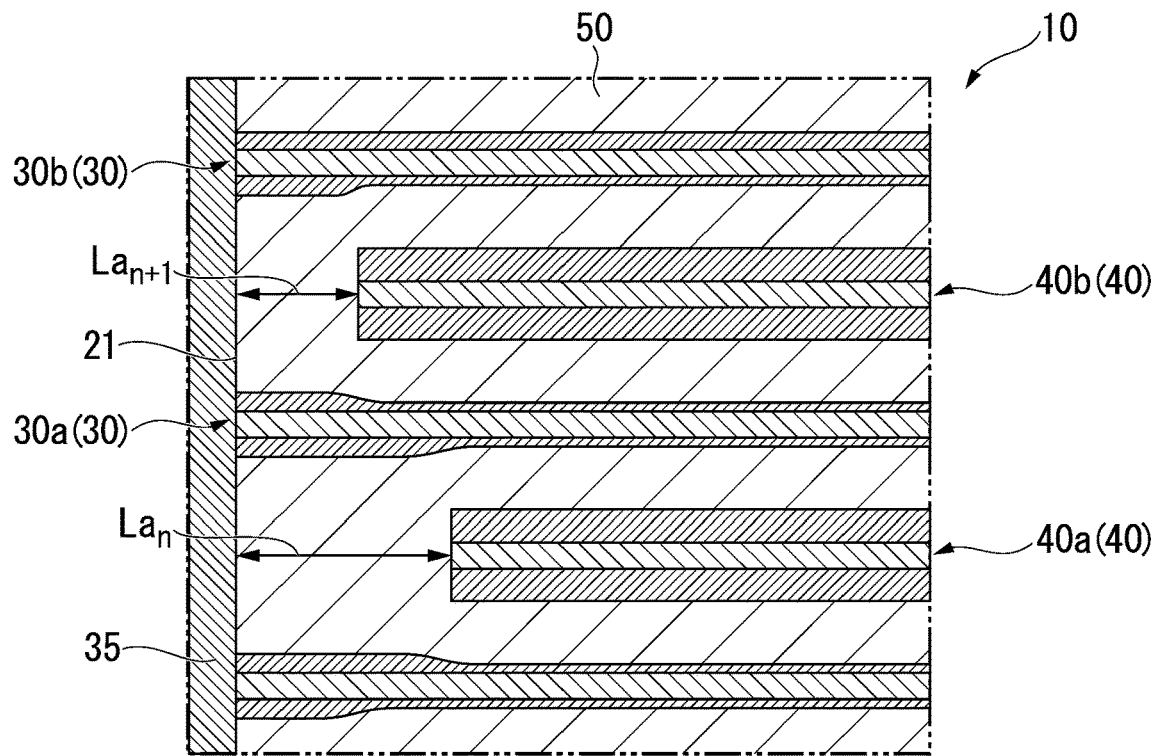
FIG. 4A is an enlarged cross-sectional view illustrating a charged state of portion IIIA of FIG. 3A.
Figure 4B:
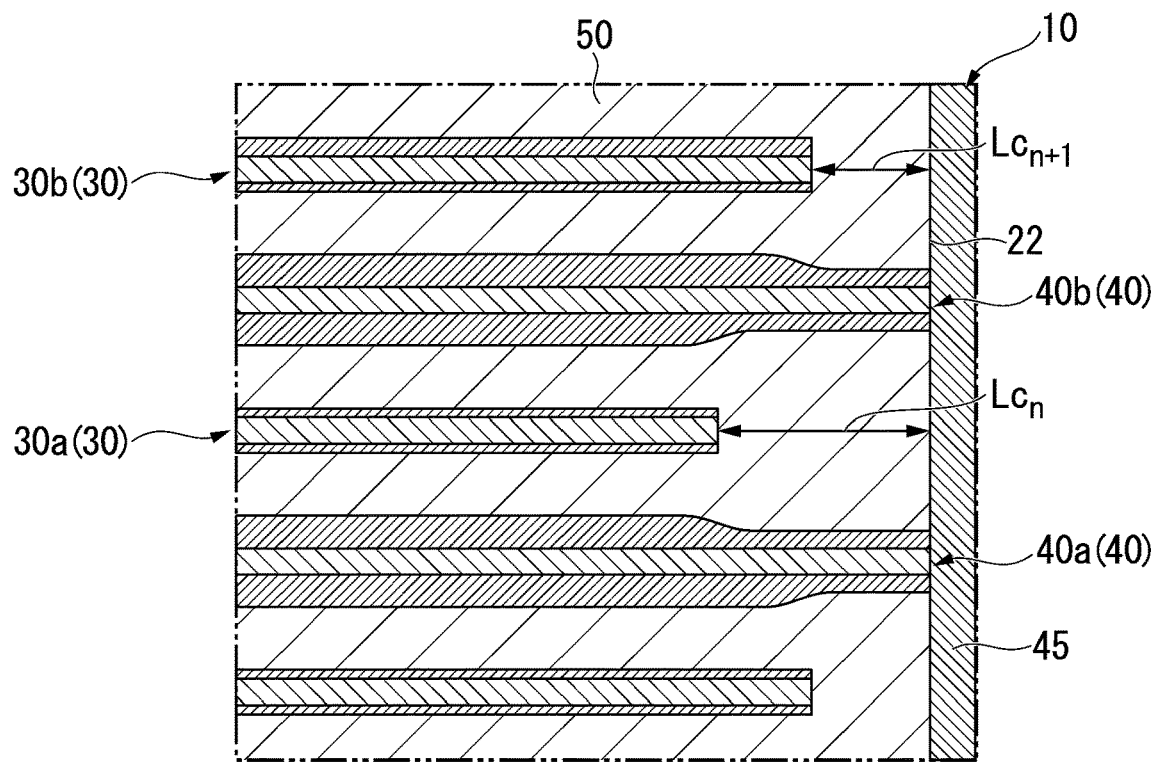
FIG. 4B is an enlarged cross-sectional view illustrating a charged state of portion IIIB of FIG. 3A.

In a charged state, the positive electrode active material layer 32 of the positive electrode 30 emits lithium ions and the negative electrode active material layer 42 of the negative electrode 40 occludes lithium ions. For this reason, as illustrated in FIGS. 4A and 4B, in a region in which the positive electrode 30 faces the negative electrode 40, the positive electrode active material layer 32 contracts and the negative electrode active material layer 42 expands. On the other hand, in a region in which the positive electrode 30 does not face the negative electrode 40, a change in volume of each of the positive electrode active material layer 32 and the negative electrode active material layer 42 does not occur. For this reason, at an end part of the negative electrode 40 on the positive electrode external terminal 35 side and an end part of the positive electrode 30 on the negative electrode external terminal 45 side, a difference in stress applied to the solid electrolyte layer 50 is generated.

In the all-solid-state battery 10 in the embodiment, at the end part of the negative electrode 40 on the side of the positive electrode external terminal 35, as illustrated in FIG. 3A, a difference ($La_{n+1}-La_n$) between a distance $La_n$ from a first lateral face side edge part of the negative electrode 40a of an $n^{th}$ layer (here, n is a natural number) to the first lateral face 21 and a distance $La_{n+1}$ from a first lateral face side edge part of the negative electrode 40b of an $n+1^{th}$ layer to the first lateral face 21 is 10 μm or more. Thus, at the end part of the negative electrode 40 on the side of the positive electrode external terminal 35, portions in which a difference in stress applied to the solid electrolyte layer 50 is generated are separated by 10 μm or more. Therefore, cracks do not easily occur in the solid electrolyte layer 50. In this specification, the $n^{th}$ layer means the positive electrode 30 or the negative electrode 40 which is an $n^{th}$ layer counting from the bottom. The $n+1^{th}$ layer means an electrode with the same polarity which is one layer above an electrode of the $n^{th}$ layer in the lamination direction. In order to minimize the occurrence of cracks, in some embodiments, the difference ($La_{n+1}-La_n$) is preferably 50 μm or more, and more preferably 100 μm or more. On the other hand, if the difference ($La_{n+1}-La_n$) is too large, there is a concern that a decrease in discharged capacity and charging capacity of the all-solid-state battery 10 occurs. For this reason, the difference ($La_{n+1}-La_n$) is preferably 400 μm or less.

Also, in order to minimize the occurrence of cracks, the difference ($La_{n+1}-La_n$) between the distance $La_n$ and the distance $La_{n+1}$ may be 10 μm or more in all of the negative electrodes 40 laminated in the all-solid-state battery 10. That is to say, an average value of differences ($La_{n+1}-La_n$) between the distance $La_n$ and the distance $La_{n+1}$ defined by the following Expression (1) may be 10 μm or more. In Expression (1), $|La_{n+1}-La_n|$ represents an absolute value of the difference ($La_{n+1}-La_n$) between the distance $La_n$ and the distance $La_{n+1}$ and m is the total number of layers of the negative electrode 40.

[Math. 1]

$$\sum_{n=1}^{m-1} |La_{n+1} - La_n|/(m-1) \quad (1)$$

Also, in the all-solid-state battery 10 in the present embodiment, at the end part of the positive electrode 30 on the side of the negative electrode external terminal 45, as illustrated in FIG. 3B, the difference ($Lc_{n+1}-Lc_n$) between the distance $Lc_n$ from the second lateral face side edge part of the positive electrode 30a of the $n^{th}$ layer to the second lateral face 22 and the distance $Lc_{n+1}$ from the second lateral face side edge part of the positive electrode 30b of the $n+1^{th}$ layer to the second lateral face 22 is 10 μm or more. Thus, at the end part of the positive electrode 30 on the negative electrode external terminal 45 side, a portion in which a difference in stress applied to the solid electrolyte layer 50 is generated is separated by 10 μm or more. Therefore, cracks do not easily occur in the solid electrolyte layer 50. In some embodiments, the difference ($Lc_{n+1}-Lc_n$) may be 50 μm or more, and may be 100 μm or more. On the other hand, the difference ($Lc_{n+1}-Lc_n$) may be 400 μm or less. Furthermore, the average value of differences ($Lc_{n+1}-Lc_n$) between the distance $Lc_n$ and the distance $Lc_{n+1}$ in the following Expression (2) may be 10 μm or more. In Expression (1), $|Lc_{n+1}-Lc_n|$ represents the absolute value of the difference ($Lc_{n+1}-Lc_n$) between the distance $Lc_n$ and the distance $Lc_{n+1}$ and in is the total number of layers of the positive electrode 30.

[Math. 2]

$$\sum_{n=1}^{m-1} |Lc_{n+1} - Lc_n|/(m-1) \quad (2)$$

Furthermore, a maximum value of the distance $Lc_n$ from the second lateral face side edge part of the positive electrode 30a of the $n^{th}$ layer (here, n is a natural number) to the second lateral face 22 may be 30% or less of a distance between the first lateral face 21 and the second lateral face 22 (a distance between end surfaces of the positive and negative electrodes). When the maximum value of the distance $La_n$ is set within the above range, it is possible to secure sufficient discharged capacity and charging capacity of the all-solid-state battery 10.

Moreover, although the distance $La_n$ from the first lateral face side edge part of the negative electrode 40a to the first lateral face 21 and the distance $Lc_n$ from the second lateral face side edge part of the positive electrode 30a of the $n^{th}$ layer to the second lateral face 22 have been described with respect to an X direction (FIG. 1) of the laminated body 20 in the above embodiment, the present disclosure is not limited thereto. In addition, instead of the constitution regarding the X direction (FIG. 1) of the laminated body 20, the same constitution as described above can be obtained with regard to a Y direction of the laminated body 20.

To be specific, with respect to the Y direction (FIG. 1) of the laminated body 20, a difference ($Wa_{n+1}-Wa_n$) between a distance $Wa_n$ from a third lateral face side edge part of the negative electrode 40a of the $n^{th}$ layer to the third lateral face 23 and a distance $Wa_{n+1}$ from a third lateral face side edge part of the negative electrode 40b of the $n+1^{th}$ layer to the third lateral face 23 may be 10 μm or more. Furthermore, a difference ($Wc_{n+1}-Wc_n$) between a distance $Wc_n$ from a fourth lateral face side edge part of the positive electrode 30a of the $n^{th}$ layer to the fourth lateral face 24 and a distance $Wc_{n+1}$ from a fourth lateral face side edge part of the positive electrode 30b of the $n+1^{th}$ layer to the fourth lateral face 24 may be 10 μm or more.

Also, both of the difference between the distance $Wc_n$ and the distance $Wc_{n+1}$ and the difference between the distance $Wa_a$ and the distance $Wa_{n+1}$ may be 10 μm or more. Furthermore, the difference between the distance $Wc_n$ and the distance $Wc_{n+1}$ and the difference between the distance $La_n$ and the distance $La_{n+1}$ may be 400 μm or less.

The positive electrode current collector layer 31 and the negative electrode current collector layer 41 may have a high conductivity. For this reason, silver, palladium, gold, platinum, aluminum, copper, nickel, or the like may be utilized for the positive electrode current collector layer 31 and the negative electrode current collector layer 41. Among these substances, copper does not easily react with a positive electrode active material, a negative electrode active material, and a solid electrolyte. For this reason, if copper is utilized for the positive electrode current collector layer 31 and the negative electrode current collector layer 41, an internal resistance of the all-solid-state battery 10 is reduced. Substances constituting the positive electrode current collector layer 31 and the negative electrode current collector layer 41 may be the same or different.

The positive electrode active material layer 32 is formed on both surfaces of the positive electrode current collector layer 31. Here, when the positive electrode 30 is formed on the uppermost layer of the laminated body 20 in the lamination direction, there is no negative electrode 40 which is above and faces the positive electrode 30 located on the uppermost layer. Therefore, in the positive electrode 30 located on the uppermost layer, the positive electrode active material layer 32 may be formed on one surface only on the lower side in the lamination direction.

The negative electrode active material layer 42 is also formed on both sides of the negative electrode current collector layer 41. Here, when the negative electrode 40 is formed on the lowermost layer of the laminated body 20 in the lamination direction, there is no positive electrode 30 which is below and faces the negative electrode 40 located on the lowermost layer. Therefore, in the negative electrode 40 located on the lowermost layer, the negative electrode active material layer 42 may be formed on only one surface on the upper side in the lamination direction.

The positive electrode active material layer 32 and the negative electrode active material layer 42 include a positive electrode active material and negative electrode active material which have electrons to be exchanged therebetween respectively. In addition, a conductive auxiliary agent, a binder, or the like may be included. The positive electrode active material and the negative electrode active material which can efficiently intercalate and deintercalate lithium ions may be utilized.

Transition metal oxides or transition metal composite oxides may be utilized for the positive electrode active material and the negative electrode active material. Specifically, lithium manganese composite oxides $Li_2Mn_aMa_{1-a}O_3$ ($0.8 \leq a \leq 1$; Ma=Co or Ni), lithium cobalt oxides ($LiCoO_2$), lithium nickelates ($LiNiO_2$), lithium manganese spinels ($LiMn_2O_4$), composite metal oxides represented by the general expression: $LiNi_xCo_yMn_zO_2$ ($x+y+z=1$; $0 \leq x \leq 1$, $0 \leq y \leq 1$, and $0 \leq z \leq 1$), lithium vanadium compounds ($LiV_2O_5$), olivin type $LiMbPO_4$ (here, Mb is one or more elements selected from Co, Ni, Mn, Fe, Mg, Nb, Ti, Al, and Zr), Li excess solid solutions represented by lithium vanadium phosphates ($Li_3V_2(PO_4)_3$ or $LiVOPO_4$), $Li_2MnO_3$-$LiMcO_2$ (Mc=Mn, Co, or Ni), lithium titanates ($Li_4Ti_5O_{12}$), composite metal oxides represented by $Li_5Ni_tCo_uAl_vO_2$ ($0.9<s<1.3$; $0.9<t+u+v<1.1$), and the like can be utilized.

The negative electrode active material and the positive electrode active material may be selected in accordance with a solid electrolyte which will be described.

For example, when $Li_{1+n}Al_nTi_{2-n}(PO_4)_3$ ($0 \leq n \leq 0.6$) is used as the solid electrolyte, it is desirable to utilize one or both of $LiVOPO_4$ and $Li_3V_2(PO_4)_3$ as the positive electrode active material and the negative electrode active material. In this case, a firm bond is provided at an interface between the positive electrode active material layer 32 and the negative electrode active material layer 42 and the solid electrolyte layer 50. Furthermore, a wide contact area can be provided at the interface between the positive electrode active material layer 32 and the negative electrode active material layer 42 and the solid electrolyte layer 50.

The solid electrolyte layer 50 contains a solid electrolyte. As the solid electrolyte, a material with a low electron conductivity and a high lithium ion conductivity may be utilized. To be specific, for example, the material be at least one selected from the group consisting of perovskite type compounds such as $La_{0.51}Li_{0.34}TiO_{2.94}$ and $La_{0.5}Li_{0.5}TiO_3$, lisicon type compounds such as $Li_{14}Zn(GeO_4)_4$, garnet type compounds such as $Li_7La_3Zr_2O_{12}$, nasicon type compounds such as $Li_{1.3}Al_{0.3}Ti_{1.7}(PO_4)_3$ and $Li_{1.5}Al_{0.5}Ge_{1.5}(PO_4)_3$, thioricicon type compounds such as $Li_{3.25}Ge_{0.25}P_{0.75}S_4$ and $Li_3PS_4$, glass compounds such as $50Li_4SiO_4 \cdot 50Li_3BO_3$, $Li_2S$—$P_2S_5$, and $Li_2O$—$Li_3O_5$—$SiO_2$, phosphoric acid compounds such as $Li_3PO_4$, $Li_{3.5}Si_{0.5}P_{0.5}O_4$, and $Li_{2.9}PO_{3.3}N_{0.46}$, amorphous such as $Li_{2.9}PO_{3.3}N_{0.46}$ (LIPON) and $Li_{3.6}Si_{0.6}P_{0.4}O_4$, and glass ceramics such as $Li_{1.07}Al_{0.69}Ti_{1.46}(PO_4)_3$ and $Li_{1.5}Al_{0.5}Ge_{1.5}(PO_4)_3$.

As the materials for the positive electrode external terminal 35 and the negative electrode external terminal 45, materials with a large conductivity may be utilized. For example, silver, gold, platinum, aluminum, copper, tin, or nickel can be used.

A method for manufacturing the all-solid-state battery 10 in the embodiment will be described below.

As the method for manufacturing the all-solid-state battery 10 in the embodiment, a simultaneous firing method may be utilized or a sequential firing method may be utilized.

The simultaneous firing method is a method in which materials forming each layer are laminated and the laminated body 20 is prepared through batch firing. The sequential firing method is a method in which each layer is prepared in order and a firing step is introduced each time each layer is manufactured. When the simultaneous firing method is used, the number of work steps for manufacturing the all-solid-state battery 10 can be reduced. Furthermore, when the simultaneous firing method is used, the laminated body 20 to be obtained becomes denser.

A case in which the all-solid-state battery 10 is manufactured using the simultaneous firing method will be described below as an example.

The simultaneous firing method includes a step of preparing a paste of each material constituting the laminated body 20, a step of applying and drying the paste to prepare a green sheet, and a step of laminating the green sheet and simultaneously firing the prepared laminated sheet.

First, materials for the positive electrode current collector layer 31, the positive electrode active material layer 32, the solid electrolyte layer 50, the negative electrode current collector layer 41, and the negative electrode active material layer 42 constituting the laminated body 20 are made into pastes.

A method for performing pasting is not particularly limited. For example, a paste is obtained by mixing powders of each material with a vehicle. Here, the vehicle is a general term for a medium in a liquid phase. The vehicle contains a solvent and a binder. According to such a method, a paste for forming the positive electrode current collector layer 31, a paste for forming the positive electrode active material layer 32, a paste for forming the solid electrolyte layer 50, a paste for forming the negative electrode current collector layer 41, and a paste for forming the negative electrode active material layer 42 are prepared.

Subsequently, a green sheet is prepared. The green sheet can be prepared, for example, as follows.

First, a paste for forming the solid electrolyte layer 50 is applied on a base material such as a PET film through a doctor blade method and dried to form the sheet-shaped solid electrolyte layer 50. Subsequently, the paste for forming the positive electrode active material layer 32, the paste for forming the positive electrode current collector layer 31, and the paste for forming the positive electrode active material layer 32 are printed in this order on the solid electrolyte layer 50 through a screen printing method and dried. Furthermore, when the PET film is peeled off, a positive electrode unit green sheet having the solid electrolyte layer 50 and the positive electrode 30 laminated therein is prepared. Subsequently, similarly, the paste for forming the solid electrolyte layer 50 is applied on a base material such as a PET film through a doctor blade method and dried to form the sheet-shaped solid electrolyte layer 50. After that, the paste for forming the negative electrode active material layer 42, the paste for forming the negative electrode current collector layer 41, and the paste for forming the negative electrode active material layer 42 are printed in this order on the solid electrolyte layer 50 through a screen printing method and dried. Furthermore, when the PET film is peeled off, a negative electrode unit green sheet having the solid electrolyte layer 50 and the negative electrode 40 laminated therein is prepared.

Also, when a layer having the paste for forming the positive electrode 30 applied thereto or a layer having the paste for forming the negative electrode 40 applied thereto are thick, a stepped portion occurring between the corresponding layer and a lower layer of the corresponding layer (a margin portion to which the paste is not applied) may be subjected to step-filling printing. As a material for the step-filling printing, the materials such as the material for the solid electrolyte layer 50 can be used.

Subsequently, the positive electrode unit green sheet and the negative electrode unit green sheet are alternately laminated.

In the positive electrode unit green sheet and the negative electrode unit green sheet, the layers are laminated to be displaced (offset) so that the difference ($Lc_{n+1}-Lc_n$) of the positive electrode 30 is 10 µm or more and the difference ($La_{n+1}-La_n$) of the negative electrode 40 is 10 µm or more. After that, the upper and lower surfaces in the lamination direction of the positive electrode unit green sheet and the negative electrode unit green sheet which have overlapped and the sheet-shaped solid electrolyte layer 50 with a prescribed thickness further overlap. In this way, a laminated green sheet is obtained. Furthermore, a distance from the third lateral face 23 of FIG. 1 to the positive electrode 30 and/or the negative electrode 40 may differ for each layer and does not need to be the same. In addition, a distance from a fourth lateral face 23 to the positive electrode 30 and/or the negative electrode 40 may also differ for each layer and does not need to be the same.

Subsequently, the laminated green sheets are collectively pressure-bonded. The pressure-bonding may be performed while heating is performing. A heating temperature at the time of pressure-bonding is, for example, 40° C. to 95° C.

The pressure-bonded green sheet laminated body is heated to, for example, 500° C. to 750° C. in a nitrogen, hydrogen, or steam atmosphere to remove the binder. After that, a sintered body (the laminated body 20) is obtained by heating the pressure-bonded green sheet laminated body at 600° C. to 1000° C. in a nitrogen, hydrogen, or water-vapor atmosphere and subjecting the pressure-bonded green sheet laminated body to simultaneous firing. A firing time is, for example, 0.1 hours to 3 hours.

After that, the positive electrode external terminal 35 is formed on the first lateral face 21 of the laminated body 20 and the negative electrode external terminal 45 is formed on the second lateral face 22 to have prescribed shapes respectively. As a method for molding the positive electrode external terminal 35 and the negative electrode external terminal 45, known methods such as sputtering methods, screen printing methods, dipping methods, and spray coating methods can be utilized.

According to the all-solid-state battery 10 in the embodiment described above, since at least one difference of the difference ($Lc_{n+1}-Lc_n$) between the distance $Lc_n$ from the end part of the positive electrode 30 of the $n^{th}$ layer on the second lateral face 22 side to the second lateral face 22 and the distance $Lc_{n+1}$ from the end part of the positive electrode 30 of the $n+1^{th}$ layer on the second lateral face 22 side to the second lateral face 22 and the difference ($La_{n+1}-La_n$) between the distance $La_n$ from the end part of the negative electrode 40 of the $n^{th}$ layer on the first lateral face 21 side to the first lateral face 21 and the distance $La_{n+1}$ from the end part of the negative electrode 40 of the n+1th layer on the first lateral face 21 to the first lateral face 21 is 10 µm or more, with regard to the X direction (FIG. 1) of the laminated body 20, the difference in stress applied to the solid electrolyte layer 50 is alleviated due to changes in volumes of the positive electrode 30 and the negative electrode 40 due to discharge and charge. For this reason, the all-solid-state battery in the embodiment has the minimized occurrence of cracks in the solid electrolyte layer 50 and has excellent cycle characteristics.

Also, when at least one difference of the difference ($Wc_{n+1}-Wc_n$) between the distance $Wc_n$ from the end part of the positive electrode 30 of the $n^{th}$ layer on the fourth lateral face 24 side to the fourth lateral face 24 and the distance $Wc_{n+1}$ from the end part of the positive electrode 30 of the $n+1^{th}$ layer on the fourth lateral face 24 side to the fourth lateral face 24 and the difference ($Wa_{n+1}-Wa_n$) between the distance $Wa_n$ from the end part of the negative electrode 40 of the $n^{th}$ layer on the third lateral face 23 side to the third lateral face 23 and the distance $Wa_{n+1}$ from the end part of the negative electrode 40 of the $n+1^{th}$ layer on the third lateral face 23 side to the third lateral face 23 is 10 µm in or more, with regard to the Y direction (FIG. 1) of the laminated body 20, the difference in stress applied to the solid electrolyte layer 50 is alleviated due to changes in volumes of the positive electrode 30 and the negative electrode 40 due to discharge and charge. For this reason, the all-solid-state battery in the embodiment has the minimized occurrence of cracks in the solid electrolyte layer 50 and has excellent cycle characteristics.

Also, since at least one of the difference ($Lc_{n+1}-Lc_n$) and the difference ($La_{n+1}-La_n$) is 10 µm or more and at least one of the difference ($Wc_{n+1}-Wc_n$) and the difference ($Wa_{n+1}-Wa_n$) is 10 µm or more, with respect to the X direction and the Y direction (FIG. 1) of the laminated body 20, the difference in stress applied to the solid electrolyte layer 50 is further alleviated and thus the occurrence of cracks in the solid electrolyte layer 50 is further minimized and more excellent cycle characteristics can be realized.

Although the embodiments of the present disclosure have been described in detail above with reference to the drawings, each constitution in each embodiment and a combination thereof are examples and the constitution can be added, omitted, replaced, and other changes are possible without departing from the gist of the present disclosure.

For example, although both of the difference ($Lc_{n+1}-Lc_n$) between the distance $Lc_n$ and the distance $Lc_{n+1}$ of the positive electrode 30 and the difference ($La_{n+1}-La_n$) between the distance $La_n$ and the distance $La_{n+1}$ of the negative electrode 40 are 10 μm or more in the all-solid-state battery 10 in the embodiment, the present disclosure is not limited to this form. Only one of the difference ($Lc_{n+1}-Lc_n$) of the positive electrode 30 and the difference ($La_{n+1}-La_n$) of the negative electrode 40 may be 10 μm or more.

Also, although the difference in stress applied to the solid electrolyte layer 50 can be alleviated due to changes in volumes of the positive electrode 30 and the negative electrode 40 even if voids are not provided in the solid electrolyte layer 50 in the all-solid-state battery 10 in the embodiment, voids may be provided in the solid electrolyte layer 50.

EXAMPLES

Example 1

(Preparation of Positive Electrode Unit Green Sheet)

A paste for forming a solid electrolyte layer 50 (a $Li_{1.3}Al_{0.3}Ti_{1.7}(PO_4)_3$ paste) was applied on a PET film base material through a doctor blade method and dried to form a sheet-shaped solid electrolyte layer 50. Subsequently, a paste for forming a positive electrode active material layer 32 (a $Li_3V_2(PO_4)_3$ paste), a paste for forming a positive electrode current collector layer 31 (a copper (Cu) paste), and a paste for forming a positive electrode active material layer 32 were printed in this order on the solid electrolyte layer 50 through a screen printing method and dried to form a positive electrode 30. Furthermore, the PET film was peeled off to prepare a positive electrode unit green sheet having the solid electrolyte layer 50 and the positive electrode 30 laminated therein. A thickness of the solid electrolyte layer 50 was 30 μm, a thickness of the positive electrode current collector layer 31 was 5 μm, and a thickness of the positive electrode active material layer 32 was 5 μm.

(Preparation of Negative Electrode Unit Green Sheet)

As in the preparation of the positive electrode unit green sheet, a paste for forming a solid electrolyte layer 50 was applied on a PET film base material through a doctor blade method and dried to form a sheet-shaped solid electrolyte layer 50. Subsequently, a paste for forming a negative electrode active material layer 42 (a $Li_3V_2(PO_4)_3$ paste), a paste for forming a negative electrode current collector layer 41 (a copper (Cu) paste), and a paste for forming a negative electrode active material layer 42 were printed in this order above the solid electrolyte layer 50 through a screen printing method and dried to form the positive electrode 30. Furthermore, the PET film was peeled off to prepare a positive electrode unit green sheet having the solid electrolyte layer 50 and the negative electrode 40 laminated therein. A thickness of the solid electrolyte layer 50 was 30 μm, a thickness of the negative electrode current collector layer 41 was 5 μm, and a thickness of the negative electrode active material layer 42 was 5 μm.

(Preparation of Laminated Body)

25 positive electrode unit green sheets and 25 negative electrode unit green sheets were alternately laminated so that an average of differences ($Lc_{n+1}-Lc_n$) of the positive electrode 30 is 10 μm and an average of differences ($La_{n+1}-La_n$) of the negative electrode 40 is 10 μm and 5 sheet-shaped solid electrolyte layers 50 with a thickness of 30 μm were laminated on each of the upper and lower surfaces in a lamination direction in which the 25 positive electrode unit green sheets and the 25 negative electrode unit green sheets overlap to form a laminated green sheet.

The obtained laminated green sheet was pressure-bonded under the conditions of 80° C. and 100 kg/cm² for 10 minutes. Subsequently, a sintered body (a laminated body 20) was obtained by heating the pressure-bonded green sheet laminated body to 650° C. in a nitrogen atmosphere and subjecting the pressure-bonded green sheet laminated body to debindering and then to simultaneous firing. In the simultaneous firing, a firing temperature was 800° C. and a firing time was 1 hour in a nitrogen atmosphere.

(Preparation of all-Solid-State Battery)

A lateral face of a laminated body was polished to expose the positive electrode current collector layer 31 to the first lateral face 21 and the negative electrode current collector layer 41 to the second lateral face 22. The first lateral face was coated with a copper paste, was fired, and then undergone electrolytic plating of nickel and tin in this order to provide a positive electrode external terminal 35 having a multilayer structure. Subsequently, an all-solid-state battery was prepared by providing a negative electrode external terminal 45 having a multilayer structure in the second lateral face 22 in the same manner as the first lateral face 21 lateral face. An average size of the all-solid-state battery prepared in this way was 4.5 mm×3.2 mm×1.1 mm.

Example 2

An all-solid-state battery was prepared in the same manner as in Example 1 except that positive electrode unit green sheets and negative electrode unit green sheets were laminated so that an average of differences ($Lc_{n+1}-Lc_n$) of a positive electrode 30 was 50 μm and an average of differences ($La_{n+1}-La_n$) of a negative electrode 40 was 50 μm in a preparation of a laminated body.

Example 3

An all-solid-state battery was prepared in the same manner as in Example 1 except that positive electrode unit green sheets and negative electrode unit green sheets were laminated so that an average of differences ($Lc_{n+1}-Lc_n$) of a positive electrode 30 was 100 μm and an average of differences ($La_{n+1}-La_n$) of a negative electrode 40 was 100 μm.

Example 4

An all-solid-state battery was prepared in the same manner as in Example 1 except that positive electrode unit green sheets and negative electrode unit green sheets were laminated so that an average of differences ($Lc_{n+1}-Lc_n$) of a positive electrode 30 was 200 μm and an average of differences ($La_{n+1}-La_n$) of a negative electrode 40 was 200 μm.

Example 5

An all-solid-state battery was prepared in the same manner as in Example 1 except that positive electrode unit green sheets and negative electrode unit green sheets were laminated so that an average of differences ($Lc_{n+1}-Lc_n$) of a positive electrode 30 was 400 μm and an average of differences ($La_{n+1}-La_n$) of a negative electrode 40 was 400 μm.

Example 6

An all-solid-state battery was prepared in the same manner as in Example 1 except that positive electrode unit green sheets and negative electrode unit green sheets were laminated so that an average of differences ($Wc_{n+1}-Wc_n$) of a positive electrode 30 was 10 μm and an average of differences ($Wa_{n+1}-Wa_n$) of a negative electrode 40 was 10 μm in a preparation of a laminated body.

Example 7

An all-solid-state battery was prepared in the same manner as in Example 6 except that positive electrode unit green sheets and negative electrode unit green sheets were laminated so that an average of differences ($Wc_{n+1}-Wc_n$) of a positive electrode 30 was 50 μm and an average of differences ($Wa_{n+1}-Wa_n$) of a negative electrode 40 was 50 μm.

Example 8

An all-solid-state battery was prepared in the same manner as in Example 6 except that positive electrode unit green sheets and negative electrode unit green sheets were laminated so that an average of differences ($Wc_{n+1}-Wc_n$) of a positive electrode 30 was 100 μm and an average of differences ($Wa_{n+1}-Wa_n$) of a negative electrode 40 was 100 μm.

Example 9

An all-solid-state battery was prepared in the same manner as in Example 6 except that positive electrode unit green sheets and negative electrode unit green sheets were laminated so that an average of differences ($Wc_{n+1}-Wc_n$) of a positive electrode 30 was 200 μm and an average of differences ($Wa_{n+1}-Wa_n$) of a negative electrode 40 was 200 μm.

Example 10

An all-solid-state battery was prepared in the same manner as in Example 6 except that positive electrode unit green sheets and negative electrode unit green sheets were laminated so that an average of differences ($Wc_{n+1}-Wc_n$) of a positive electrode 30 was 400 μm and an average of differences ($Wa_{n+1}-Wa_n$) of a negative electrode 40 was 400 μm.

Example 11

An all-solid-state battery was prepared in the same manner as in Example 1 except that positive electrode unit green sheets and negative electrode unit green sheets were laminated so that an average of differences ($Lc_{n+1}-Lc_n$) of a positive electrode 30 was 200 μm, an average of differences ($La_{n+1}-La_n$) of a negative electrode 40 was 200 μm, an average of differences ($Wc_{n+1}-Wc_n$) of the positive electrode 30 was 10 μm, and an average of differences ($Wa_{n+1}-Wa_n$) of the negative electrode 40 was 10 μm in a preparation of a laminated body.

Example 12

An all-solid-state battery was prepared in the same manner as in Example 11 except that a lamination was performed so that an average of differences ($Wc_{n+1}-Wc_n$) of a positive electrode 30 was 50 μm and an average of differences ($Wa_{n+1}-Wa_n$) of a negative electrode 40 was 50 μm.

Example 13

An all-solid-state battery was prepared in the same manner as in Example 11 except that a lamination was performed so that an average of differences ($Wc_{n+1}-Wc_n$) of a positive electrode 30 was 100 μm and an average of differences ($Wa_{n+1}-Wa_n$) of a negative electrode 40 was 100 μm.

Example 14

An all-solid-state battery was prepared in the same manner as in Example 11 except that a lamination was performed so that an average of differences ($Wc_{n+1}-Wc_n$) of a positive electrode 30 was 200 μm and an average of differences ($Wa_{n+1}-Wa_n$) of a negative electrode 40 was 200 μm.

Example 15

An all-solid-state battery was prepared in the same manner as in Example 11 except that a lamination was performed so that an average of differences ($Wc_{n+1}-Wc_n$) of a positive electrode 30 was 400 μm and an average of differences ($Wa_{n+1}-Wa_n$) of a negative electrode 40 was 400 μm.

Comparative Example 11

An all-solid-state battery was prepared in the same manner as in Example 1 except that positive electrode unit green sheets and negative electrode unit green sheets were laminated without intentionally displacing from these in a length direction (the X direction) in a preparation of a laminated body.

Comparative Example 21

An all-solid-state battery was prepared in the same manner as in Example 1 except that positive electrode unit green sheets and negative electrode unit green sheets were laminated so that an average of differences ($Lc_{n+1}-Lc_n$) of a positive electrode 30 was 5 μm and an average of differences ($La_{n+1}-La_n$) of a negative electrode 40 was 5 μm.

Comparative Example 31

An all-solid-state battery was prepared in the same manner as in Example 6 except that positive electrode unit green sheets and negative electrode unit green sheets were laminated without intentionally displacing from these in a width direction (the Y direction).

Comparative Example 41

An all-solid-state battery was prepared in the same manner as in Example 6 except that positive electrode unit green sheets and negative electrode unit green sheets were laminated so that an average of differences ($Wc_{n+1}-Wc_n$) of a positive electrode 30 was 5 μm and an average of differences ($Wa_{n+1}-Wa_n$) of a negative electrode 40 was 5 μm.

Comparative Example 51

An all-solid-state battery was prepared in the same manner as in Example 11 except that positive electrode unit green sheets and negative electrode unit green sheets were laminated without intentionally displacing from these in a length direction (the X direction) and a width direction (the Y direction).

Comparative Example 61

An all-solid-state battery was prepared in the same manner as in Example 11 except that positive electrode unit green sheets and negative electrode unit green sheets were laminated so that an average of differences ($Lc_{n+1}-Lc_n$) of a positive electrode 30 was 5 µm, an average of differences ($La_{n+1}-La_n$) of a negative electrode 40 was 5 µm, an average of differences ($Wc_{n+1}-Wc_n$) of the positive electrode 30 was 5 µm, and an average of differences ($Wa_{n+1}-Wa_n$) of the negative electrode 40 was 5 µm.

[Evaluation]

Subsequently, the all-solid batteries obtained in the Examples and the Comparative Examples were measured and evaluated through the following method. The results are shown in Tables 1 to 3 described below.

(Average Values of $Lc_{n+1}-Lc_n$ and $La_{n+1}-La_n$)

Cross sections of the prepared all-solid batteries were observed using a scanning electron microscope (manufactured by Hitachi High-Technologies Corporation, product name "S-4800") and the differences ($Lc_{n+1}-Lc_n$) of the positive electrodes 30 and the differences ($La_{n+1}-La_n$) of the negative electrodes 40 were measured and averages thereof were calculated.

(Crack Occurrence Rate after 10 Cycles)

The prepared all-solid batteries (n=200) were charged and discharged for 10 cycles using a charge/discharge tester (manufactured by Asuka Electronics Co., Ltd., product name "ACD-01"). The discharging and charging was performed within the range of 0 V to 2.0 V under the conditions of a constant current of 20 µA. Subsequently, six surfaces of the external forms of the all-solid batteries were observed using an optical microscope and a product having cracks confirmed on even one surface thereof was regarded as an occurrence rate of a crack-occurrence product. The crack occurrence rate was defined as a crack occurrence rate for 100 all-solid batteries.

(Capacity Retention Rate after 100 Cycles)

The prepared all-solid batteries (n=10) were charged and discharged for 100 cycles using a charge/discharge tester (manufactured by Asuka Electronics Co., Ltd., product name "ACD-01"). The discharge and charge conditions were the same as the discharge and charge conditions performed at the crack occurrence rate. A discharged capacity of a first cycle was defined to be 100% and a value obtained by dividing a discharge capacity of a $100^{th}$ cycle by the discharge capacity of the first cycle was defined as a capacity retention rate.

(Theoretical Capacity Calculated from Length of Electrode)

Cross sections of the prepared all-solid batteries were observed using a scanning electron microscope and a length of the entire positive electrodes 30 from connection portions to the positive electrode external terminals 35 to the end parts on the side of the negative electrode external terminals 45 was also measured. A total of the measured lengths of the positive electrodes 30 were taken as a theoretical capacity value at a ratio when the total length of the positive electrode 30 in Comparative Example 1 was defined as 100.

Tables 1 to 3 show relative values with respect to the theoretical capacity of the all-solid-state battery in Comparative Example 1 as 100.

TABLE 1

|  | Average value of $Lc_{n+1} - Lc_n$ (µm) | Average value of $La_{n+1} - La_n$ (µm) | Crack occurrence rates after 10 cycles (%) | Capacity retention rate after 100 cycles (%) | Theoretical capacity calculated from electrode area (relative value in which Comparative Example 1 is defined as 100) |
|---|---|---|---|---|---|
| Example 1 | 10 | 10 | 50 | 89 | 99.8 |
| Example 2 | 50 | 50 | 20 | 96 | 98.9 |
| Example 3 | 100 | 100 | 5 | 99 | 97.9 |
| Example 4 | 200 | 200 | 0 | 100 | 95.8 |
| Example 5 | 400 | 400 | 0 | 100 | 91.6 |
| Comparative Example 1 | 0 | 0 | 100 | 80 | 100 |
| Comparative Example 2 | 5 | 5 | 100 | 82 | 99.9 |

TABLE 2

|  | Average value of $Wc_{n+1} - Wc_n$ (µm) | Average value of $Wa_{n+1} - Wa_n$ (µm) | Crack occurrence rates after 10 cycles (%) | Capacity retention rate after 100 cycles (%) | Theoretical capacity calculated from electrode area (relative value in which Comparative Example 1 is defined as 100) |
|---|---|---|---|---|---|
| Example 6 | 10 | 10 | 52 | 87 | 99.8 |
| Example 7 | 50 | 50 | 23 | 93 | 98.9 |

TABLE 2-continued

|  | Average value of $Wc_{n+1} - Wc_n$ (μm) | Average value of $Wa_{n+1} - Wa_n$ (μm) | Crack occurrence rates after 10 cycles (%) | Capacity retention rate after 100 cycles (%) | Theoretical capacity calculated from electrode area (relative value in which Comparative Example 1 is defined as 100) |
|---|---|---|---|---|---|
| Example 8 | 100 | 100 | 5 | 95 | 97.9 |
| Example 9 | 200 | 200 | 0 | 98 | 95.8 |
| Example 10 | 400 | 400 | 0 | 97 | 91.6 |
| Comparative Example 3 | 0 | 0 | 100 | 80 | 100 |
| Comparative Example 4 | 5 | 5 | 100 | 82 | 99.9 |

TABLE 3

|  | Average value of $Lc_{n+1} - Lc_n$ (μm) | Average value of $La_{n+1} - La_n$ (μm) | Average value of $Wc_{n+1} - Wc_n$ (μm) | Average value of $Wa_{n+1} - Wa_n$ (μm) | Crack occurrence rates after 10 cycles (%) | Capacity retention rate after 100 cycles (%) | Theoretical capacity calculated from electrode area (relative value in which Comparative Example 1 is defined as 100) |
|---|---|---|---|---|---|---|---|
| Example 11 | 200 | 200 | 10 | 10 | 45 | 100 | 95.8 |
| Example 12 | 200 | 200 | 50 | 50 | 18 | 100 | 94.9 |
| Example 13 | 200 | 200 | 100 | 100 | 3 | 100 | 93.9 |
| Example 14 | 200 | 200 | 200 | 200 | 0 | 100 | 91.8 |
| Example 15 | 200 | 200 | 400 | 400 | 0 | 100 | 87.6 |
| Comparative Example 5 | 0 | 0 | 0 | 0 | 100 | 80 | 100 |
| Comparative Example 6 | 5 | 5 | 5 | 5 | 100 | 82 | 99.9 |

From the results in Table 1, the crack occurrence rates after 10 cycles of the all-solid batteries in Examples 1 to 5 in which both of the average of the differences ($Lc_{n+1}-Lc_n$) and the average value of the differences ($La_{n+1}-La_n$) were 10 μm or more were lower than the crack occurrence rates after 10 cycles of the all-solid batteries in Comparative Examples 1 and 2 in which both of the average of the differences ($Lc_{n+1}-Lc_n$) and the average of the differences ($La_{n+1}-La_n$) were 5 μm or less and the capacity retention rate after 100 cycles of the all-solid batteries in Examples 1 to 5 were higher than the capacity retention rates after 100 cycles of the all-solid batteries in Comparative Examples 1 and 2. Particularly, the crack occurrence rates after 10 cycles of the all-solid batteries in Examples 2 to 5 in which both of the average value of the differences ($Lc_{n+1}-Lc_n$) and the average value of the differences ($La_{n+1}-La_n$) were 50 μm or more were as low as 20% or less and the crack occurrence rates after 100 cycles of the all-solid batteries were as high as 96% or more.

Also, from the results in Table 2, the crack occurrence rates after 10 cycles of the all-solid batteries in Examples 6 to 10 in which both of the average value of the differences ($Wc_{n+1}-Wc_n$) and the average value of the differences ($Wa_{n+1}-Wa_n$) were 10 μm or more were lower than the crack occurrence rates after 10 cycles of the all-solid batteries in Comparative Examples 3 and 4 in which both of the average of the differences ($Wc_{n+1}-Wc_n$) and the average of the differences ($Wa_{n+1}-Wa_n$) were 5 μm or less and the capacity retention rates after 100 cycles of the all-solid batteries in Examples 6 to 10 were higher than the capacity retention rates after 100 cycles of the all-solid batteries in Comparative Examples 3 and 4. Particularly, the crack occurrence rates after 10 cycles of the all-solid batteries in Examples 7 to 10 in which both of the average value of the differences ($Wc_{n+1}-Wc_n$) and the average value of the differences ($Wa_{n+1}-Wa_n$) were 50 μm or more were as low as 23% or less and the capacity retention rates after 100 cycles of the all-solid batteries in Examples 7 to 10 were as high as 93% or more.

Furthermore, from the results in Table 3, the crack occurrence rates after 10 cycles of the all-solid batteries in Examples 11 to 15 in which both of the average value of the differences ($Lc_{n+1}-Lc_n$) and the average value of the differences ($La_{n+1}-La_n$) were 200 μm and both of the average value of the differences ($Wc_{n+1}-Wc_n$) and the average value of the differences ($Wa_{n+1}-Wa_n$) were 10 min or more were significantly low at 45% or less than the crack occurrence rates after 10 cycles of the all-solid batteries in Comparative Examples 5 and 6 in which both of the average of the differences ($Lc_{n+1}-Lc_n$) and the average of the differences ($La_{n+1}-La_n$) were 5 μm or less and both of the average value of the differences ($Wc_{n+1}-Wc_n$) and the average of the differences ($Wa_{n+1}-Wa_n$) were 5 μm or less and the capacity retention rate after 100 cycles of the all-solid batteries in Examples 11 to 15 were extremely high at 100% than the capacity retention rate after 100 cycles of the all-solid batteries in Comparative Examples 5 and 6. Particularly, the crack occurrence rates after 10 cycles of the all-solid batteries in Examples 12 to 15 in which both of the average value of the differences ($Lc_{n+1}-Lc_n$) and the average value of the differences ($La_{n+1}-La_n$) were 200 μm and both of the average value of the differences ($Wc_{n+1}-Wc_n$) and the average value of the differences ($Wa_{n+1}-Wa_n$) were 50 μm or more were extremely as low as 18% or less.

REFERENCE SIGNS LIST

10 All-solid-state battery
20 Laminated body
21 First lateral face
22 Second lateral face
23 Third lateral face
24 Fourth lateral face
30 Positive electrode
31 Positive electrode current collector layer
32 Positive electrode active material layer
35 Positive electrode external terminal
40 Negative electrode
41 Negative electrode current collector layer
42 Negative electrode active material layer
45 Negative electrode external terminal
50 Solid electrolyte layer

The invention claimed is:

1. An all-solid-state battery, comprising:
   a laminated body including
      positive electrodes, each including a positive electrode current collector layer and a positive electrode active material layer, and
      negative electrodes, each including a negative electrode current collector layer and a negative electrode active material layer,
   the positive electrodes and the negative electrodes being alternately laminated with a solid electrolyte layer arranged therebetween,
   lateral faces including a first lateral face which is formed as a surface parallel to a lamination direction and at which the positive electrode current collector layer of each of the positive electrodes is exposed, and a second lateral face which faces the first lateral face and at which the negative electrode current collector layer of each of the negative electrodes is exposed;
   a positive electrode external terminal attached to the first lateral face; and
   a negative electrode external terminal attached to the second lateral face,
   wherein:
      at least one difference of:
         a difference between a distance $Lc_n$ from a second lateral face side edge part of a positive electrode of an $n^{th}$ layer to the second lateral face and a distance $Lc_{n+1}$ from a second lateral face side edge part of a positive electrode of an $n+1^{th}$ layer to the second lateral face, and
         a difference between a distance $La_n$ from a first lateral face side edge part of a negative electrode of an $n^{th}$ layer to the first lateral face and a distance $La_{n+1}$ from a first lateral face side edge part of a negative electrode of an $n+1^{th}$ layer to the first lateral face,
      is 10 μm or more, and
      n is a natural number.

2. The all-solid-state battery according to claim 1, wherein both of the difference between the distance $Lc_n$ and the distance $Lc_{n+1}$ and the difference between the distance $La_n$ and the distance $La_{n+1}$ are 10 μm or more.

3. The all-solid-state battery according to claim 1, wherein the difference between the distance $Lc_n$ and the distance $Lc_{n+1}$ and the difference between the distance $La_n$ and the distance $La_{n+1}$ are 400 μm or less.

4. The all-solid-state battery according to claim 1, wherein a maximum value of the distance $Lc_n$ from the second lateral face side edge part of the positive electrode of the $n^{th}$ layer to the second lateral face is 30% or less of a distance between the first lateral face and the second lateral face.

5. The all-solid-state battery according to claim 1, wherein
   the laminated body further includes a third lateral face and a fourth lateral face which are arranged to face each other, and
   at least one difference of:
      a difference ($Wc_{n+1}-Wc_n$) between a distance $Wc_n$ from a fourth lateral face side edge part of the positive electrode of the $n^{th}$ layer to the fourth lateral face and a distance $Wc_{n+1}$ from a fourth lateral face side edge part of the positive electrode of the $n+1^{th}$ layer to the fourth lateral face, and
      a difference ($Wa_{n+1}-Wa_n$) between a distance $Wa_n$ from a third lateral face side edge part of the negative electrode of the $n^{th}$ layer to the third lateral face and a distance $Wa_{n+1}$ from the third lateral face side edge part of the negative electrode of the $n+1^{th}$ layer to the third lateral face,
   is 10 μm or more.

6. The all-solid-state battery according to claim 5, wherein both of the difference between the distance $Wc_n$ and the distance $Wc_{n+1}$ and the difference between the distance $Wa_n$ and the distance $Wa_{n+1}$ are 10 μm or more.

7. The all-solid-state battery according to claim 5, wherein the difference between the distance $Wc_n$ and the distance $Wc_{n+1}$ and the difference between the distance $Wa_n$ and the distance $Wa_{n+1}$ are 400 μm or less.

8. The all-solid-state battery according to claim 1, wherein:
   the positive electrodes include:
      first positive electrodes having second lateral face side edge parts positioned at a relatively smaller distance from the second lateral face, and
      second positive electrodes having second lateral face side edge parts positioned at a relatively larger distance from the second lateral face,
   the first positive electrodes and the second positive electrodes are alternately arranged along the lamination direction,
   the negative electrodes include:
      first negative electrodes having first lateral face side edge parts positioned at a relatively smaller distance from the first lateral face, and second negative electrodes having first lateral face side edge parts positioned at a relatively larger distance from the first lateral face, and the first negative electrodes and the second negative electrodes are alternately arranged along the lamination direction.

9. The all-solid-state battery according to claim 1, wherein the at least one difference is in a range of 50 to 400 µm.

10. The all-solid-state battery according to claim 1, wherein the second lateral face side edge part of each of the positive electrode of the $n^{th}$ layer and the positive electrode of the $n+1^{th}$ layer faces the second lateral face in a direction transverse to the lamination direction, and the first lateral face side edge part of each of the negative electrode of the $n^{th}$ layer and the negative electrode of the $n+1^{th}$ layer faces the first lateral face in the direction transverse to the lamination direction.

* * * * *